United States Patent
Meckenstock et al.

(10) Patent No.: US 10,633,030 B2
(45) Date of Patent: Apr. 28, 2020

(54) BRAKE BOOSTER DEVICE WITH ACTUATOR LEVER

(71) Applicant: Ford Global Technologies, LLC, Dearborn, MI (US)

(72) Inventors: Daniel Meckenstock, Wuppertal (DE); Marius Sawatzki, Pulheim (DE); Istvan Somogyvari, Cologne (DE); Michael Spurling, Romford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 15/936,603

(22) Filed: Mar. 27, 2018

(65) Prior Publication Data

US 2019/0009767 A1   Jan. 10, 2019

(30) Foreign Application Priority Data

Jul. 4, 2017  (DE) ................ 10 2017 211 342

(51) Int. Cl.
| | |
|---|---|
| *B62D 21/15* | (2006.01) |
| *B60T 7/06* | (2006.01) |
| *B60L 3/00* | (2019.01) |
| *B62D 25/08* | (2006.01) |

(52) U.S. Cl.
CPC .......... *B62D 21/152* (2013.01); *B60L 3/0007* (2013.01); *B60T 7/065* (2013.01); *B62D 25/082* (2013.01); *B60Y 2306/01* (2013.01)

(58) Field of Classification Search
None
See application file for complete search history.

(56) References Cited

U.S. PATENT DOCUMENTS

| | | | | |
|---|---|---|---|---|
| 4,266,630 A | * | 5/1981 | Nilsson .............. | B60K 5/1208 180/291 |
| 6,041,674 A | * | 3/2000 | Kato ................. | B60R 21/09 180/274 |
| 6,269,900 B1 | * | 8/2001 | Adams ............... | B60R 21/09 180/274 |
| 7,195,091 B2 | * | 3/2007 | Rixon ................ | B60T 7/065 180/274 |
| 7,740,278 B2 | * | 6/2010 | Kakuta .............. | B62D 3/12 280/777 |
| 2007/0283690 A1 | * | 12/2007 | Miller .............. | B60R 21/09 60/547.1 |

(Continued)

FOREIGN PATENT DOCUMENTS

| | | |
|---|---|---|
| DE | 202010017605 | 10/2012 |
| DE | 202017104335 | 8/2017 |

*Primary Examiner* — Drew J Brown
(74) *Attorney, Agent, or Firm* — David Coppiellie; Carlson, Gaskey & Olds, P.C.

(57) ABSTRACT

An exemplary brake booster device includes a brake booster mounted on a vehicle component, and an actuator lever that, in response to a force applied to the actuator by a gearbox housing, pivots to move the brake booster upward. An exemplary method includes pivoting an actuator lever about a pivot axis under a force effect in an X direction resulting from a gearbox housing, and, during the pivoting, using the actuator lever apply a force in a Z direction to a module mounted on a bulkhead to alter a position of the module mounted on the bulkhead.

18 Claims, 6 Drawing Sheets

(56) References Cited

U.S. PATENT DOCUMENTS

| | | | |
|---|---|---|---|
| 2013/0333376 A1* | 12/2013 | Murayama | B60T 7/042 |
| | | | 60/545 |
| 2017/0253220 A1* | 9/2017 | Ishihara | G05G 1/32 |
| 2018/0229771 A1* | 8/2018 | Sekine | B60K 1/00 |
| 2019/0009767 A1* | 1/2019 | Meckenstock | B60T 17/18 |
| 2019/0009768 A1* | 1/2019 | Meckenstock | B60T 7/065 |
| 2019/0039588 A1* | 2/2019 | Somogyvari | B60T 17/00 |

* cited by examiner

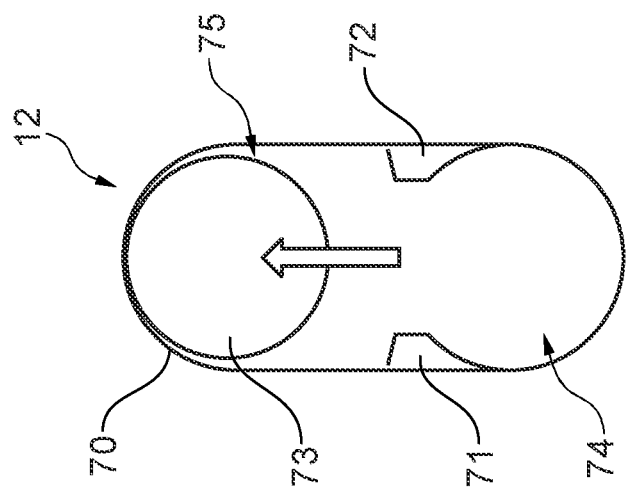
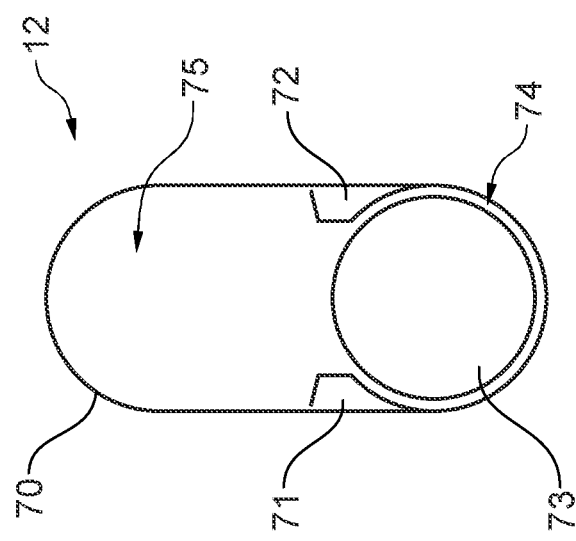
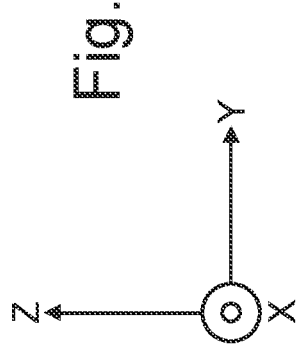

BRAKE BOOSTER DEVICE WITH ACTUATOR LEVER

CROSS-REFERENCE TO RELATED APPLICATIONS

This application claims priority to German Patent Application No. 102017211342.1, which was filed on 4 Jul. 2017 and is incorporated herein by reference in its entirety.

TECHNICAL FIELD

This disclosure relates generally to a brake booster mounted on a vehicle component via at least one fastening point.

BACKGROUND

Motor vehicles can be equipped with such brake boosters for boosting the pedal force. Low-pressure brake boosters can be used. However, motor vehicles can also be provided with electric brake boosters. Electric brake boosters can be particularly advantageous for use in electric vehicles and hybrid vehicles. In electric brake boosters, the pulse of the brake pedal can be used for inducing the alternating voltage of a coil to release kinetic energy through the combination of coil and core. The kinetic energy supports the brake force of the pedal. DE Patent No. 202010017605 describes an exemplary electric brake booster.

Gearboxes for hybrid vehicles conventionally have relatively large dimensions since they contain components and functions that are not required by gearboxes for vehicles having only an internal combustion engine. For example, the gearbox of a hybrid vehicle can have components and functions making it possible to switch between the different drive types (e.g., electric and internal combustion engine). The electric motors and the necessary additional gearbox units can also be accommodated within the gearbox housing.

If a large gearbox with an associated housing and an electric brake booster are used in a hybrid vehicle, a direct force connection between the gearbox housing and the brake booster system can be produced during a frontal impact due to the packaging of the gearbox housing and the electric brake booster system in the X direction. However, this can lead to undesirable deformations of the bulkhead, to a displacement of the brake pedal, and to deformations of the dashboard carrier. The steering column can also move.

SUMMARY

A brake booster device according to an exemplary aspect of the present disclosure includes a brake booster mounted on a vehicle component via at least one fastening point, and an actuator lever which is designed to pivot about a pivot axis extending in the Y direction under a force effect in the X direction resulting from a gearbox housing. The actuator lever applies a force to the brake booster in the Z direction, as a result of which the position of the brake booster is alterable. The actuator lever has an angular arm which is supported below the brake booster on a vehicle component via at least one pivot bearing. A convex side of the actuator lever faces away from the brake booster such that the actuator lever is configured to apply an upward force to the brake booster in the Z direction during a pivotal movement.

In another example of the foregoing device, the brake booster is rotated about a rotary axis in the Y direction as a result of the force of the actuator lever.

In another example of any of the foregoing devices, the rotary axis is located at a fastening point of the brake booster on the vehicle component.

In another example of any of the foregoing devices, the brake booster is displaced in the Z direction as a result of the force of the actuator lever.

In another example of any of the foregoing devices, the brake booster is displaced along a surface of the vehicle component on which the at least one fastening point is located.

In another example of any of the foregoing devices, the angular arm is supported on a vehicle component via a fork having two fork bearings.

In another example of any of the foregoing devices, the at least one fastening point is formed by an elongated hole having two lateral narrowed portions through which the elongated hole is divided into two mutually adjacent hole regions, wherein the longitudinal extent of the elongated hole extends in the Z direction and, upon the application of a force to the brake booster in the Z direction, a screw connection moves from a first hole region into a second hole region with a widening of the narrowed portions.

A method, according to another exemplary aspect of the present disclosure includes pivoting an actuator lever about a pivot axis under a force effect in an X direction resulting from a gearbox housing, and during the pivoting, using the actuator lever apply a force in a Z direction to a module mounted on a bulkhead to alter a position of the module mounted on the bulkhead.

In another example of the foregoing method, the X direction is horizontal and the Z direction is vertical.

In another example of any of the foregoing methods, the application of the force in the Z direction by the actuator lever to the module displaces the module in the Z direction.

In another example of any of the foregoing methods, the module is a brake booster.

In another example of any of the foregoing methods, the module remains attached to the bulkhead when the position of the module is altered by the actuator applying the force in the Z direction to the module.

A brake booster device according to yet another exemplary aspect of the present disclosure includes, among other things, a brake booster mounted on a vehicle component, and an actuator lever that, in response to a force applied to the actuator by a gearbox housing, pivots to move the brake booster upward.

In another example of the forgoing device, the actuator lever comprises an actuator arm that is pivotably coupled to a portion of the vehicle component.

In another example of any of the forgoing devices, at least one pivot bearing pivotably couples the actuator arm to the vehicle component.

In another example of any of the forgoing devices, the vehicle component is a bulkhead.

In another example of any of the forgoing devices, a convex side of the actuator lever faces away from the brake booster such that the actuator lever is configured to apply an upward force to the brake booster in the Z direction during a pivotal movement.

In another example of any of the forgoing devices, the brake booster is rotated about a rotary axis in the Y direction as a result of the force of the actuator lever.

In another example of any of the forgoing devices, the rotary axis is located at a fastening point of the brake booster on the vehicle component.

In another example of any of the forgoing devices, the brake booster is displaced in the Z direction as a result of the force of the actuator lever.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 6A illustrates an embodiment of a fastening point in normal operation.

FIG. 6B illustrates an embodiment of a fastening point after the deflection of a brake booster.

DETAILED DESCRIPTION

Figure 1:
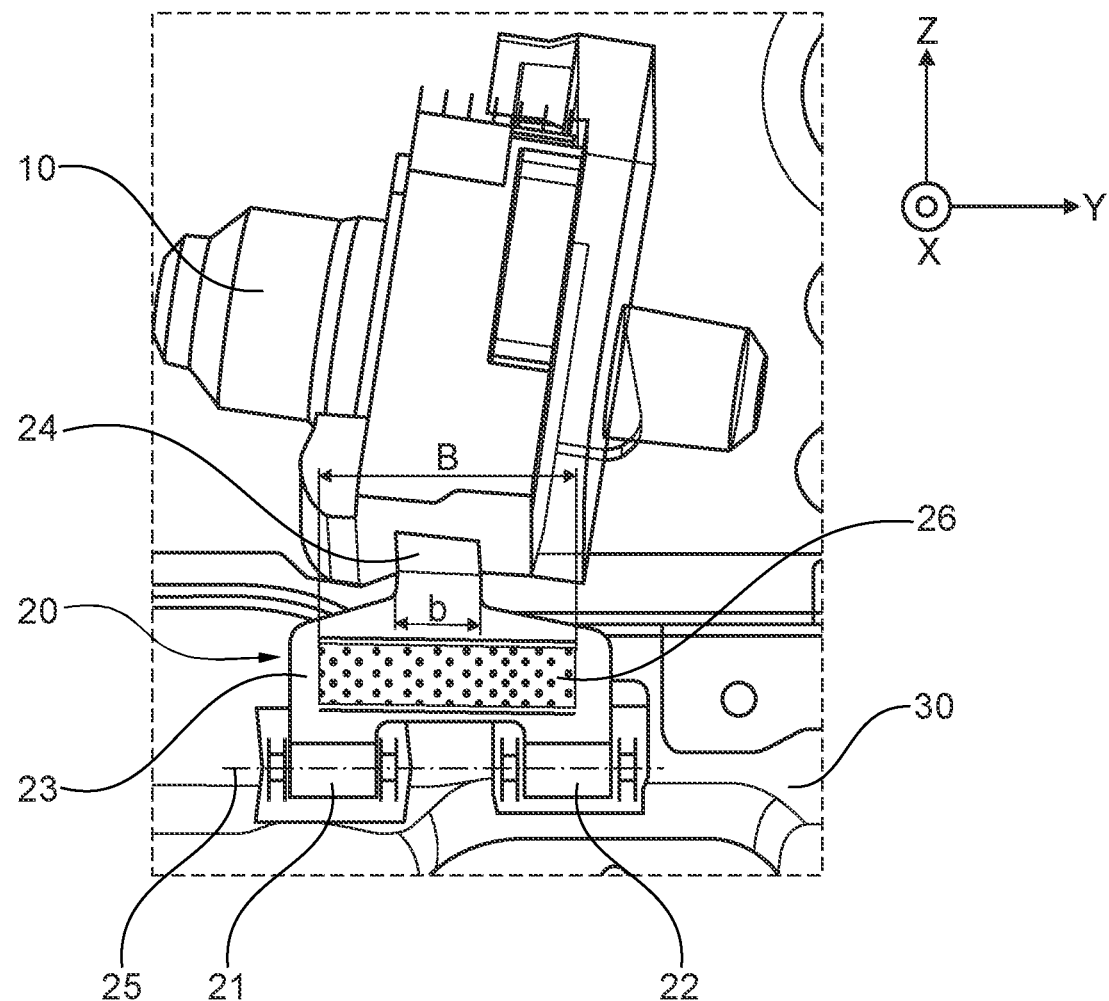
FIG. 1 illustrates a front view of an embodiment of an electric brake booster with an actuator lever.

The disclosure is generally directed toward providing a brake booster device that responds to a frontal impact to a vehicle. The brake booster device can be particularly appropriate for electric brake boosters used in combination with a large gearbox. In some variations, the brake booster device can push away other modules mounted on the bulkhead.

In an exemplary non-limiting embodiment of this disclosure, a brake booster is mounted on a vehicle component via at least one fastening point. The brake booster can be an electric or electromechanical brake booster. The brake booster can be mounted on a bulkhead of a motor vehicle. This takes place via at least one fastening point which can be designed for example as a screw connection. A plurality of fastening points can be provided. However, other modules (e.g. ESP modules) fastened to the bulkhead can also be moved from their position.

An actuator lever can pivot about a pivot axis extending in the Y direction under a force applied in the X direction resulting from a gearbox housing. The actuator lever can apply a force to the brake booster in the Z direction, as a result of which the position of the brake booster is alterable. The X direction here represents the longitudinal direction of the motor vehicle in the vehicle coordinate system, whilst the Z direction represents the vertical. The Y direction corresponds to the transverse direction of the vehicle.

The actuator lever of the brake booster device according to an exemplary embodiment is arranged and designed such that it exerts a force on the brake booster in the Z direction when forced in the X direction by a gearbox housing. As a result of this force in the Z direction, the brake booster is moved out of the X load path in the Z direction.

In an exemplary embodiment, the brake booster can be moved upward in the Z direction and can slide along the upper side of the gearbox housing. The actuator lever can be pivotably mounted below the brake booster, and can pivot to apply an upward force to the brake booster in the Z direction. The actuator lever can have an angular arm that is supported below the brake booster on a vehicle component via at least one pivot bearing. The actuator lever can have a convex side that faces away from the brake booster.

If, in the event of a frontal impact, the housing of a gearbox of the motor vehicle can be moved toward the brake booster in the X direction. In response, the gearbox housing can impact against the actuator lever, which is thus pivoted about a pivot axis extending in the Y direction and thereby exerts a force on the brake booster in the Z direction. The actuator lever is therefore pivoted out of a normal position, in which it does not apply a force to the brake booster, into an activated position in which it pushes the brake booster away in the Z direction. The actuator lever here can already be in contact with the brake booster in the normal position. The required contact can result from the pivotal movement.

In the normal position, however, the actuator lever can be held securely so that it does not become worn during operation of the vehicle and it does not generate any undesired noises. This can be achieved in various ways of pivotably mounting the actuator lever on a vehicle component. For example, the actuator lever, like the brake booster, can be mounted on the bulkhead of a vehicle. This mounting takes place via at least one pivot bearing.

A pivot bearing of the actuator lever can be formed as a hinge. For example, the pivot bearing can be formed by bushings having a bolt guided through. Parts of the bushings can be welded to the bulkhead. The pivot axis of the actuator lever is then formed by the bolts. In an alternative embodiment, a pivot bearing can be formed by a sheet metal connector having a region which is less rigid. In this less rigid region, the sheet metal connector bends under the force effect of a gearbox housing so that the actuator lever is pivoted about a pivot axis in this region. To hold the actuator lever in its position during normal operation of the vehicle, it is for example possible for a clamping force within a hinge to be selected with an appropriate magnitude. As a result of the force effect of the gearbox housing, the clamping force can be overcome and the actuator lever can pivot. Alternatively or additionally, a deformable holding clip can be provided, which holds the actuator lever in its normal position but gives way under a sufficiently high force on the actuator lever.

In an exemplary embodiment, the actuator lever has an angled or bent region in which a gearbox housing contacts. This contact can activate the actuator lever in the event of a frontal impact. This angled or bent region can be referred to as an angular arm. The angular arm, in an example, may not form a sharp edge on the side which contacts the gearbox housing, but a rounded curve. This can be advantageous in that the gearbox housing can slide easily along the actuator lever in the event of an impact.

During the pivotal movement of the actuator lever as a result of an impact from a gearbox housing, the angular arm can applies a force to the brake booster in the Z direction with an end tip. This end tip can be constructed to be rounded and smooth so that the actuator lever does not catch upon contact with the brake booster, but can instead slide along the brake booster. The contact side of the brake booster can be likewise expediently constructed to be planar in this region.

The gearbox housing can contact a convex side of the angular arm, which is supported on a vehicle component via at least one pivot bearing such that the convex side faces away from the brake booster. This form enables the force effect in the X direction to be converted into a force on the brake booster in the Z direction. The gearbox housing can slides along the convex side of the actuator lever or vice versa. In contrast, the opposite side of the angular arm can face the brake booster or the bulkhead. This opposite side can enclose an angle and therefore be concave in design. However, the opposite side can also have other forms.

The angling or bending of the angular arm can be selected such that the force generated by the actuator lever on the brake booster in the Z direction is sufficiently high to alter the position of the brake booster. This does not have to be a force solely in the Z direction; rather, the force of the actuator lever on the brake booster can also have components in the X direction. The actuator lever is designed to be so rigid and stable that it withstands the forces which occur. To this end, the actuator leer can be designed to be relatively high strength, e.g. consisting of steel, sheet metal, aluminum, forged members, etc.

In an exemplary non-limiting embodiment, the angular arm of the actuator lever can supported on a vehicle component such as the bulkhead via a fork having two fork bearings. Each of these fork bearings can be formed by a described pivot bearing. As seen in the X direction, it can be provided that, in the region of the fork, the actuator lever widens in comparison with the width of the angular arm. The angular arm is then designed as a relatively narrow profile which widens significantly into a fork-shaped region which has the fork bearings. In the event of a frontal impact, the gearbox housing impacts against the actuator lever in this widened region of the fork. The width of this region is selected for example such that, in the Y direction, there is sufficient overlap with the extent of the gearbox for a robust interaction.

The widened region of the fork then has a contact surface in which the actuator lever is contacted by the gearbox housing with forces in the X direction in substantially all possible contact scenarios. The contact surface here is sufficiently large, and the actuator lever is sufficiently stable in its bearing region, to also be able to compensate moments, which are generated by forces applied to the outer regions of the contact surface.

The position of the brake booster can be altered in various ways as a result of the pivotal movement of the actuator lever. In an exemplary embodiment, the brake booster is rotated about a rotary axis, which extends in the Y direction, as a result of the force of the actuator lever. This rotary axis is formed in particular on the vehicle component on which the brake booster is mounted, e.g. on the bulkhead. For example, such a rotary axis is formed at a fastening point of the brake booster on the vehicle component. It can also be formed by two fastening points.

The actuator lever then applies a force to the brake booster in the Z direction, which brings about a rotation of the brake booster about this rotary axis. The rotary axis here is preferably selected such that the underside of the brake booster is rotated into a position in which the gearbox housing can move in the form of a wedge under the brake booster or the underside of the brake booster can slide along the upper side of the gearbox housing. The side of the brake booster that faces the gearbox housing is therefore raised as a result of the rotation.

The rotary axis can be located in the lower, central or upper region of the brake booster. The twisting of the brake booster can furthermore bring about or require that the fastening points become detached or at least deformed. The fastening points are formed for example by screw connections. In some examples, the bulkhead can deform so that the brake booster can rotate about a horizontal rotary axis. Although the brake booster then partially penetrates into the bulkhead, deep penetration of the brake booster into the passenger compartment does not take place since the gearbox housing and the brake booster do not form a package in the X direction.

In another exemplary embodiment, the brake booster is linearly displaced in the Z direction as a result of the force of the actuator lever. The brake booster is therefore pushed upward in its entirety. For example, the brake booster here can be displaced along a surface of the vehicle component on which the at least one fastening point is located. If this vehicle component is the bulkhead, the brake booster is displaced upward along this bulkhead. If the bulkhead is sloped, the displacement also has components in the X direction in addition to components in the Z direction.

This displacement of the brake booster can also bring about or require that fastening points become detached or at least deformed. Fastening points can inevitably give way here or they are specially constructed to enable a displacement of the brake booster as of a certain force component in the Z direction. In an exemplary embodiment, it is provided that at least one fastening point is formed by an elongated hole having two lateral narrowed portions through which the elongated hole is divided into two mutually adjacent hole regions. The longitudinal extent of the elongated hole extends in the Z direction here and, upon the application of a force to the brake booster in the Z direction, a screw connection moves from a first hole region into a second hole region with a widening of the narrowed portions. The brake booster can thus be displaced in a controlled manner without a screw connection detaching completely.

Therefore, a brake booster, together with an actuator lever and the fastening of the brake booster on a vehicle component, forms a brake booster device that can advantageously be used in a motor vehicle. In the event of a frontal impact, a force of the gearbox housing in the X direction can be converted by the device into a force in the Z direction, which advantageously pushes the brake booster upward. The brake booster can be rotated or displaced here. A combination of both movements is also possible. The load path in the X direction from the gearbox housing to the brake booster is therefore advantageously interrupted. The deformation of the bulkhead is slight and the brake pedal and the steering column are likewise not displaced, or are only slightly displaced, in the direction of the passenger compartment. This increases the safety of the occupants in the event of a frontal impact.

The features of some of the exemplary embodiments are particularly suitable for use with large gearboxes having large gearbox housings, as are typically used in hybrid vehicles. It is furthermore particularly suitable for use with electric brake boosters, which are likewise used in hybrid vehicles. The exemplary embodiments can be used particularly advantageous here owing to the size and arrangement of these vehicle components, although it can also advantageously be used with other combinations of gearboxes and modules assembled on the bulkhead (brake boosters, ESP modules, etc.).

Another exemplary aspect of the present disclosure can includes a motor vehicle having an embodiment of the brake booster device. This relates in particular to a hybrid vehicle having a gearbox which is designed to switch between an electric drive and another drive type. For purposes of this disclosure, a frontal impact involves any impact, i.e. accident, in which a correspondingly acting force component is generated.

With reference to FIG. 1, an exemplary brake booster 10 is part of a brake booster device having an actuator lever 20. In this example, the brake booster 10 is an electric brake booster. The view of FIG. 1 represents a view of the brake booster 10 in the X direction of a motor vehicle. The brake booster 10 is fastened to the bulkhead 30 of the motor vehicle and is connected in a known manner with a brake pedal and a brake system of the motor vehicle.

An actuator lever 20 is mounted below the brake booster 10. This actuator lever is substantially formed by an angular arm 24, which is likewise mounted on the bulkhead 30 via a fork 23 having two fork bearings 21 and 22. The actuator lever 20 is pivotable about a pivot axis 25 in the two fork bearings 21, 22. The angular arm 24 is designed as a narrow profile which widens in the region of the fork 23. A contact surface 26 can therefore be formed in the region of the fork 23, which contact surface has a width B in the Y direction which is substantially greater than the width b of the angular arm 24 in the Y direction.

Figure 2:
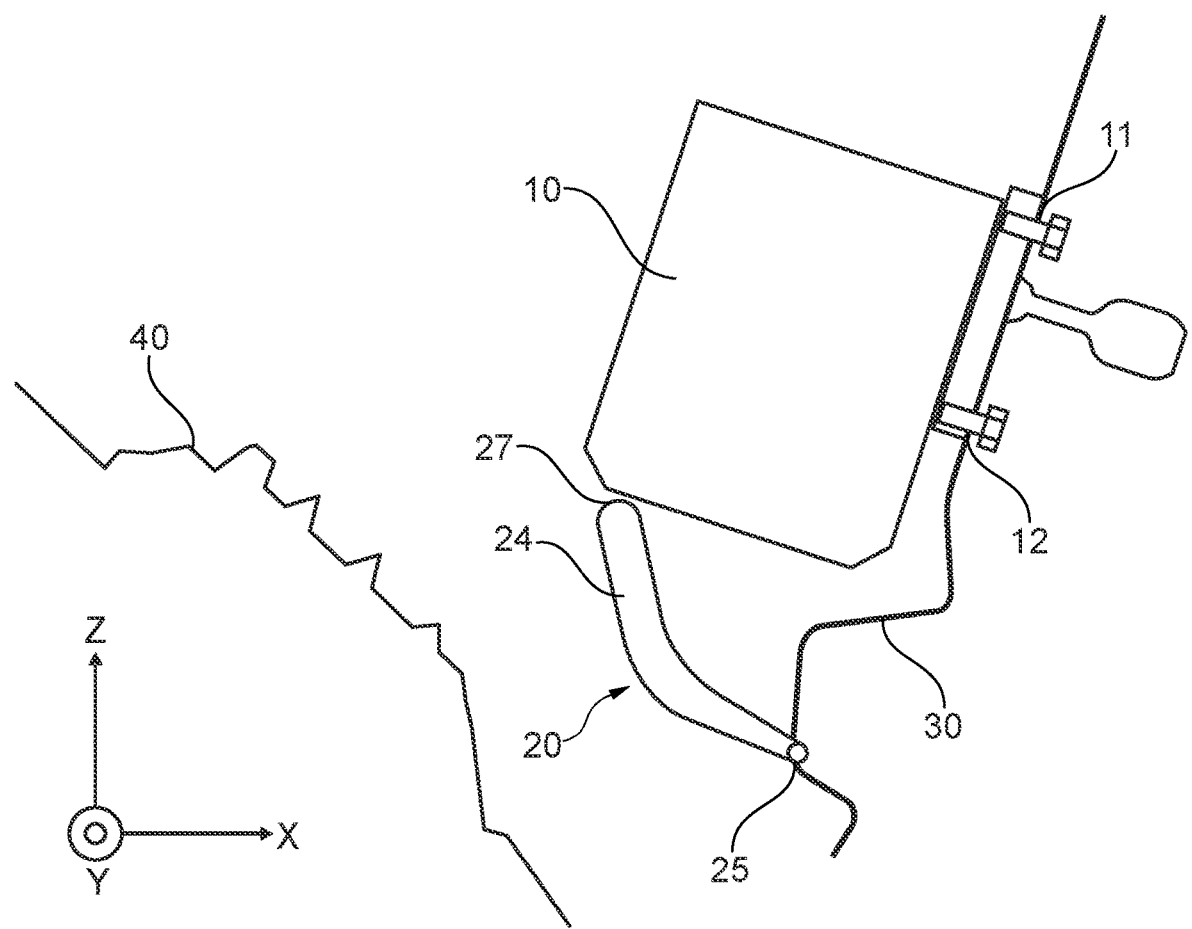
FIG. 2 illustrates a schematic side view of a gearbox housing and a brake booster with an actuator lever in normal operation.

With reference to the schematic side view of FIG. 2, the brake booster 10 having an actuator lever 20 in normal operation of the associated motor vehicle. In this situation, a gearbox housing 40 is located distance from the actuator lever 20, wherein only that side of the gearbox housing 40 which faces the brake booster 10 is illustrated in a simplified manner. The front of the vehicle is located on the left in the illustration of FIG. 2, which means that the gearbox housing 40 moves toward the brake booster 10 in the event of a frontal impact.

The brake booster 10 is mounted on the bulkhead 30 via at least one fastening point. By way of example, two fastening points 11 and 12 located above one another are shown, which are formed by screw connections. To the right of the bulkhead 30, there is the vehicle compartment with the footwell of the driver. The bulkhead 30 is illustrated merely schematically here and can be designed in known ways.

The actuator lever 20, which is pivotably mounted on the bulkhead 30, is located below the brake booster 10. The pivot axis 25 extends in the Y direction. An angular arm 24 of the actuator lever 20 is constructed to be angled or bent, wherein the convex side of the actuator lever 20 faces the gearbox housing 40, or the convex side faces away from the bulkhead 30 and the brake booster 10. The entire actuator lever 20 is shown angled here so that a corresponding concave side is formed on the side facing the bulkhead 30. However, this only represents one exemplary embodiment and the form of the actuator lever 20 can also be selected differently. By way of example, it can also be constructed to be linear on the side facing the bulkhead 30.

The actuator lever 20 here is mounted below the brake booster 10 such that its free end 27 faces in the direction of the underside of the brake booster 10. In normal operation of the motor vehicle, this tip 27 of the actuator lever 20 is in contact with the underside of the brake booster 10 or is located at a slight spacing from the underside of the brake booster 10. The actuator lever 20 projects from the bulkhead 30 and is held in this position by holding clips (not illustrated) or a corresponding clamping force in the fork bearings 21, 22.

Figure 3:
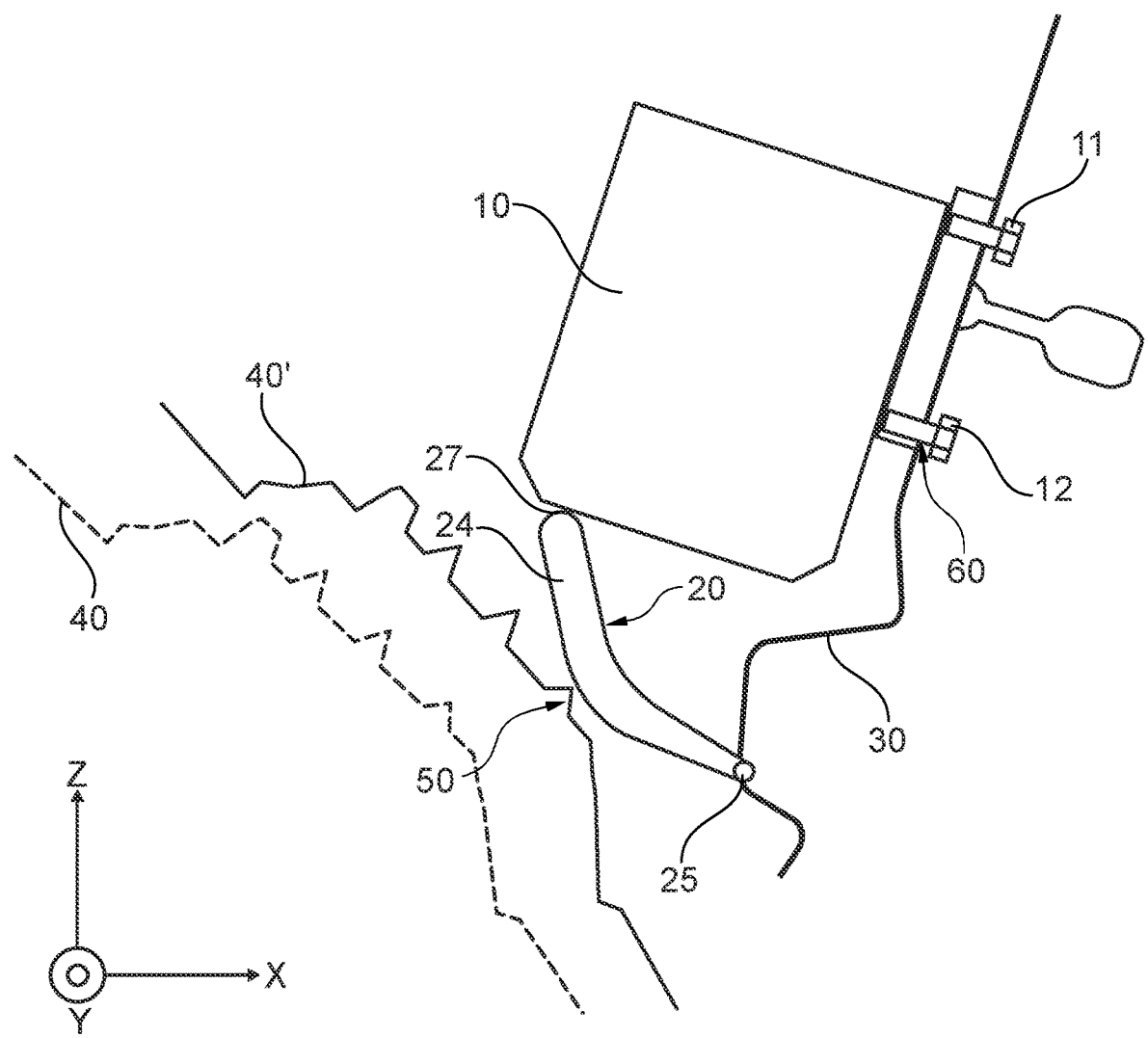
FIG. 3 illustrates a gearbox housing upon first contact with a brake booster with an actuator lever according to FIG. 2.

In the event of a frontal impact, the gearbox housing 40 moves toward the actuator lever 20 until it makes contact with the actuator lever 20. FIG. 3 shows this position of the gearbox housing 40 as reference numeral 40' while the original position of the gearbox housing 40 is illustrated by dashed lines. The first contact takes place in the region of the angling of the actuator lever 20 at a first contact point 50.

Figure 4:
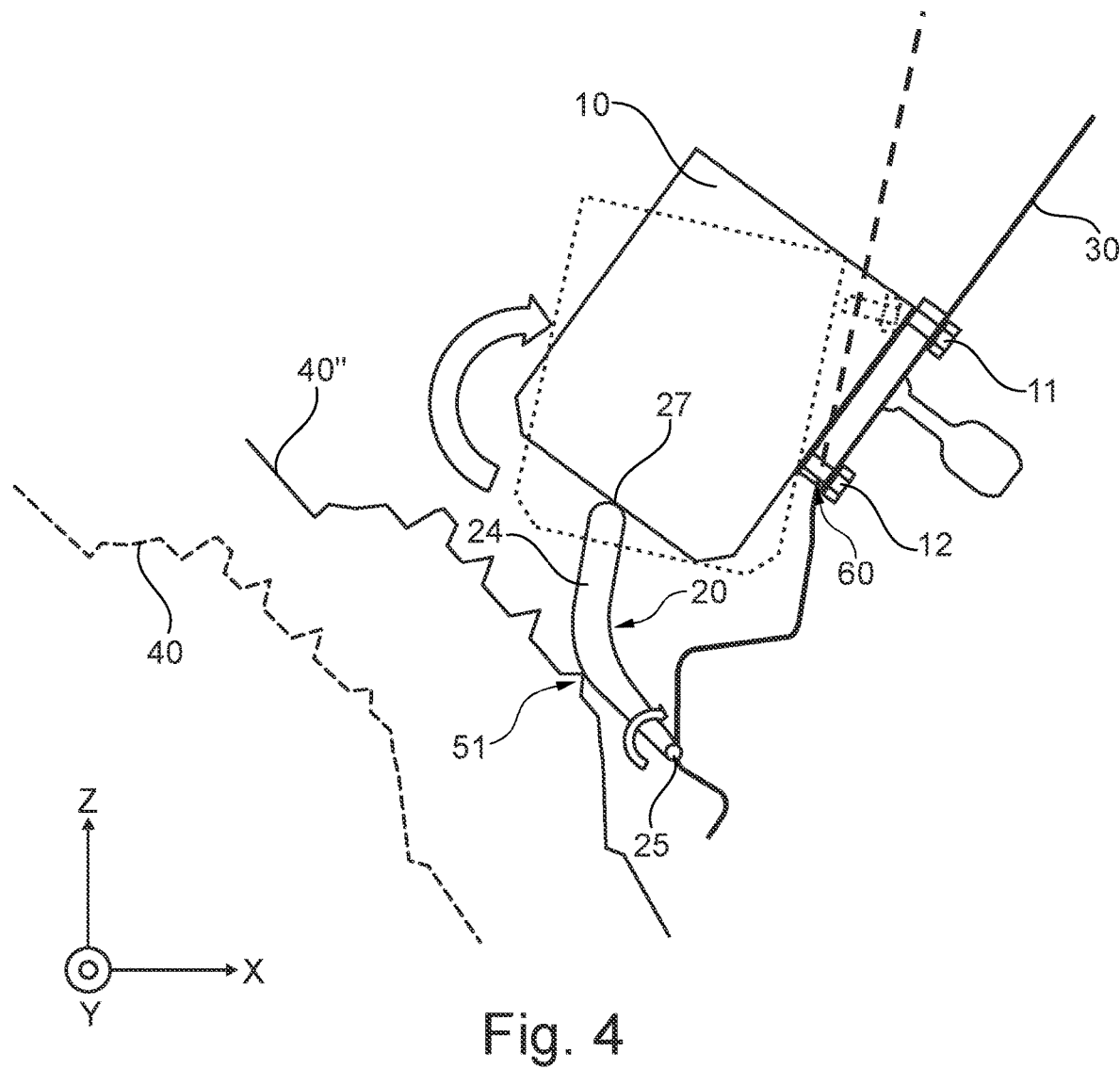
FIG. 4 illustrates a brake booster according to FIG. 2 after the deflection of the brake booster by the actuator lever according to a first embodiment.

In this exemplary non-limiting embodiment, further movement of the gearbox housing 40 is shown in FIG. 4 as reference numeral 40" while the original position of the gearbox housing 40 is again illustrated by dashed lines. In FIG. 4, the actuator lever 20 has been pivoted upward about the pivot axis 25 in the direction of the brake booster 20 by the force effect of the gearbox housing 40", as is denoted by a smaller rotation arrow. The free end 27 of the angular arm 24 has pushed the underside of the brake booster 10 upward, whereby a rotation of the brake booster 10 about a rotary axis 60 has been brought about (larger rotation arrow). In contrast, the original position of the brake booster 10 is illustrated by dashed lines.

The rotary axis 60 extends in the Y direction and is located in the region of the bulkhead 30. It is furthermore located in the region of a lower fastening point 12. In this position, the gearbox housing 40" abuts against the actuator lever 20 at a second contact point 51. For a rotation of the brake booster 10 about the rotary axis 60, the bulkhead 30 has deformed in the region of the brake booster 10 as a result of having given way in the direction of the passenger compartment. In contrast, the original extent of the bulkhead 30 is illustrated by dashed lines. The rotation of the brake booster 10 can furthermore bring about or require that the fastening points have become detached or at least been significantly deformed.

The force of the gearbox housing 40" in the X direction has therefore been converted by the actuator lever 20 into a force on the brake booster 10 in the Z direction. In FIG. 4, the gearbox housing 40" is shown in the position in which a twisting of the brake booster has taken place, i.e. upon twisting contact with the actuator lever 20. In this position of the brake booster 10, the load path between the gearbox housing 40" and the brake booster 10 in the X direction can be lifted. The gearbox housing 40" can move below the brake booster 10 or the brake booster 10 can slide with its underside along the upper side of the gearbox housing 40".

Figure 5:
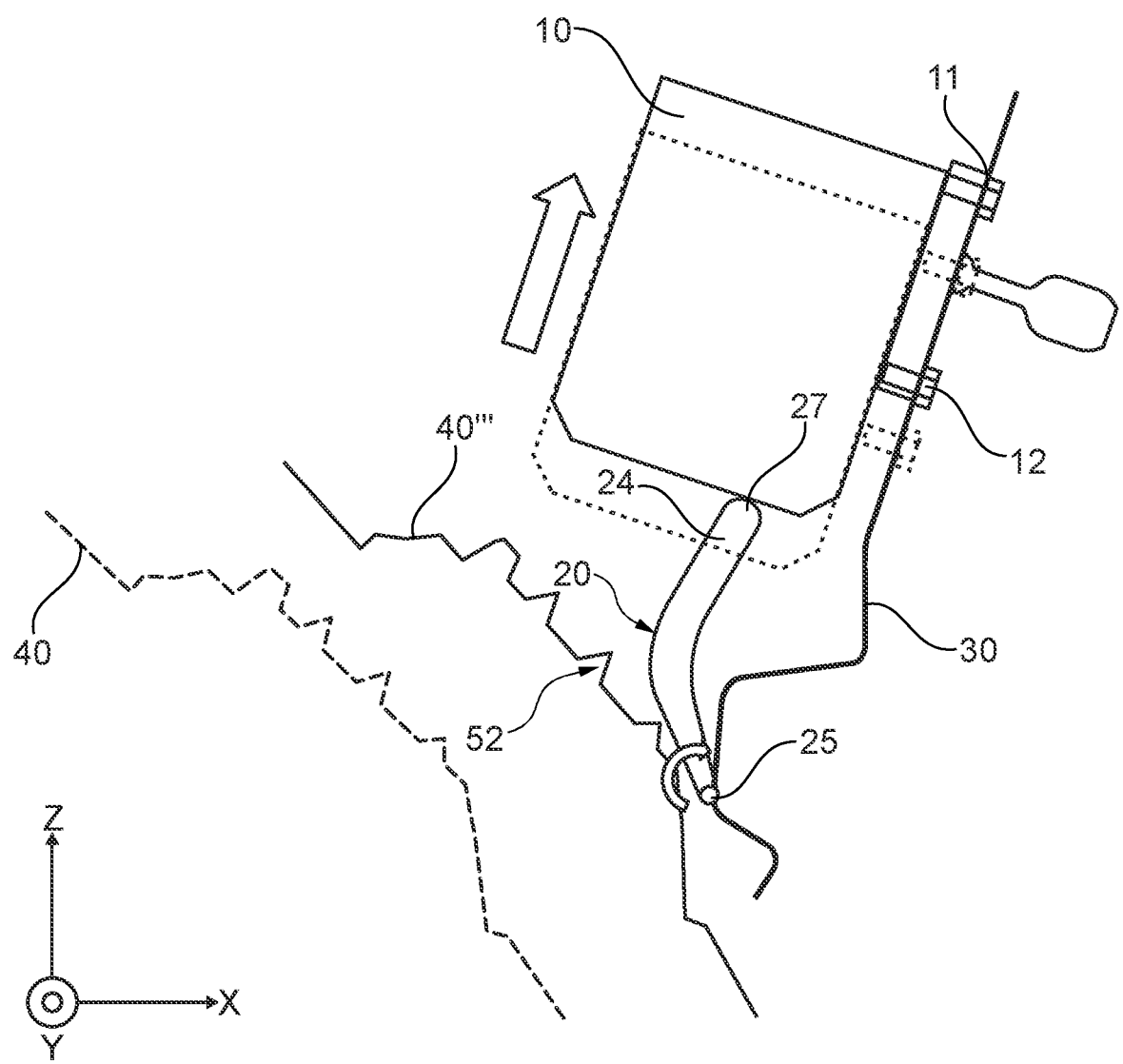
FIG. 5 illustrates a brake booster according to FIG. 2 after the deflection of the brake booster by the actuator lever according to a second embodiment.

Another exemplary non-limiting embodiment of the present disclosure is shown in FIG. 5. In this example, the brake booster 10 is not rotated about a rotary axis by the actuator lever 20, but is displaced in the Z direction. After a first contact between the gearbox housing and the actuator lever 20, the gearbox housing 40" moves into a position in which it contacts the actuator lever 20 at a third contact point 52 and has likewise pivoted it about the pivot axis 25 in the direction of the underside of the brake booster 10 (smaller rotation arrow). Through contact with the tip 27 of the angular arm 24, the brake booster 10 has been displaced upward along the bulkhead 30 in the Z direction (straight arrow). In contrast, the original position of the brake booster 10 is illustrated by dashed lines.

The force of the gearbox housing 40''' in the X direction has also been converted into a force on the brake booster 10 in the Z direction here by the actuator lever 20 and, in this position of the brake booster 10, the load path between the gearbox housing 40''' and the brake booster 10 in the X direction is lifted. The gearbox housing 40″ can move under the brake booster 10 or the brake booster 10 slides with its underside along the upper side of the gearbox housing 40‴. In FIG. 5, the gearbox housing 40″ is shown in the position in which a displacement of the brake booster has taken place, i.e. upon a displacement contact with the actuator lever 20.

Owing to the slope of the bulkhead 30, the displacement of the brake booster 10 also has a component in the X direction here. It is, however, significant that the underside of the brake booster 10 is now located higher than before. This can bring about or require that the fastening points have detached or are at least significantly deformed. In contrast, a significant deformation of the bulkhead is not brought about. To enable a controlled displacement of the brake booster 10 along the bulkhead 30, it is for example possible to form special fastening points. In particular, this refers to screw connections which, as of a certain force in the longitudinal direction of an elongated hole, can alter their position within the elongated hole.

In the exemplary embodiment of FIGS. 6A and 6B, a fastening point 12 has an elongated hole 70. The elongated hole 70 is located in the bulkhead, although it can also be located in a housing wall of the brake booster. The brake booster can furthermore be mounted on the bulkhead by a plurality of these fastening points. The inner contour of the elongated hole 70 has two lateral narrowed portions 71 and 72. As a result of these narrowed portions, two hole regions 74 and 75 are formed within the elongated hole 70 and the longitudinal direction of the elongated hole 70 extends in the Z direction. The hole region 74 is therefore located below the hole region 75.

The brake booster is connected to the bulkhead by a screw connection 73, which is illustrated in a simplified manner. After the assembly of the brake booster, this screw connection 73 is located in the lower hole region 74, as is shown in FIG. 6A. In this state, the narrowed portions 71, 72 form a defined assembly position for the screw connection 73.

If the brake booster is moved significantly upward in the Z direction by the force of the actuator lever, the screw connection 73 is pushed against the narrowed portions 71, 72. These narrowed portions 71, 72 deform as of a certain force or they are destroyed and the screw connection 73 moves from the lower hole region 74 into the upper hole region 75. It is thus possible to achieve a controlled displacement of the brake booster along one or more elongated holes.

The FIGS. 4 and 5 can, in some examples, be combined so that the brake booster can be both rotated and displaced in the Z direction by the actuator lever.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A brake booster device, comprising:
    a brake booster mounted on a vehicle component via at least one fastening point; and
    an actuator lever which is designed to pivot about a pivot axis extending in the Y direction under a force effect in the X direction resulting from a gearbox housing, whereby the actuator lever applies a force to the brake booster in the Z direction, as a result of which the position of the brake booster is alterable, wherein the actuator lever has an angular arm which is supported below the brake booster on the vehicle component via at least one pivot bearing, wherein a convex side of the actuator lever faces away from the brake booster such that the actuator lever is configured to apply an upward force to the brake booster in the Z direction during a pivotal movement.

2. The brake booster device of claim 1, wherein the brake booster is rotated about a rotary axis in the Y direction as a result of the force of the actuator lever.

3. The brake booster device of claim 2, wherein the rotary axis is located at a fastening point of the brake booster on the vehicle component.

4. The brake booster device of claim 1, wherein the brake booster is displaced in the Z direction as a result of the force of the actuator lever.

5. The brake booster device of claim 1, wherein the brake booster is displaced along a surface of the vehicle component on which the at least one fastening point is located.

6. The brake booster device of claim 1, wherein the angular arm is supported on a vehicle component via a fork having two fork bearings.

7. The brake booster device of claim 1, wherein the at least one fastening point is formed by an elongated hole having two lateral narrowed portions through which the elongated hole is divided into two mutually adjacent hole regions, wherein the longitudinal extent of the elongated hole extends in the Z direction and, upon the application of a force to the brake booster in the Z direction, a screw connection moves from a first hole region into a second hole region with a widening of the narrowed portions.

8. A method, comprising:
    pivoting an actuator lever about a pivot axis under a force effect in an X direction resulting from a gearbox housing; and
    during the pivoting, using the actuator lever to apply a force in a Z direction to a module mounted on a bulkhead to alter a position of the module mounted on the bulkhead, wherein a convex side of the actuator lever faces away from the brake booster such that the actuator lever is configured to apply an upward force to the brake booster in the Z direction during a pivotal movement.

9. The method of claim 8, wherein the X direction is horizontal and the Z direction is vertical.

10. The method of claim 8, wherein the application of the force in the Z direction by the actuator lever to the module displaces the module in the Z direction.

11. The method of claim 8, wherein the module is a brake booster.

12. The method of claim 8, wherein the module remains attached to the bulkhead when the position of the module is altered by the actuator applying the force in the Z direction to the module.

13. A brake booster device, comprising:
    a brake booster mounted on a vehicle component; and
    an actuator lever that, in response to a force applied to the actuator by a gearbox housing, pivots to move the brake booster upward,
    wherein the actuator lever comprises an actuator arm that is pivotably coupled to a portion of the vehicle component,
    wherein at least one pivot bearing pivotably couples the actuator arm to the vehicle component.

14. The brake booster device of claim 13, wherein the vehicle component is a bulkhead.

15. The brake booster device of claim 13, wherein a convex side of the actuator lever faces away from the brake booster such that the actuator lever is configured to apply an upward force to the brake booster in the Z direction during a pivotal movement.

16. The brake booster device of claim 13, wherein the brake booster is rotated about a rotary axis in the Y direction as a result of the force of the actuator lever.

17. The brake booster device of claim 16, wherein the rotary axis is located at a fastening point of the brake booster on the vehicle component.

18. The brake booster device of claim 16, wherein the brake booster is displaced in the Z direction as a result of the force of the actuator lever.

* * * * *